March 29, 1960  C. A. CLARKE, JR., ET AL  2,930,979
NETWORK METER

Filed Aug. 26, 1958  4 Sheets-Sheet 1

INVENTORS
Clifton A. Clarke, Jr.
Alexander M. McQuarrie
John F. Scamman
BY Robert F. Peck
Their Attorney March 29, 1960  C. A. CLARKE, JR., ET AL  2,930,979
NETWORK METER Filed Aug. 26, 1958  4 Sheets-Sheet 3

INVENTOR.
Clifton A. Clarke, Jr.
Alexander M. McQuarrie
John F. Scamman
BY Robert J. Peck
Their Attorney March 29, 1960 C. A. CLARKE, JR., ET AL 2,930,979
NETWORK METER
Filed Aug. 26, 1958 4 Sheets-Sheet 4

INVENTORS
Clifton A. Clarke, Jr.
Alexander M. McQuarrie
John F. Scamman
BY *Robert F. Peele*
Their Attorney United States Patent Office 2,930,979
Patented Mar. 29, 1960

2,930,979

NETWORK METER

Clifton A. Clarke, Jr., Dover, Alexander M. McQuarrie, Rochester, and John F. Scamman, Dover, N.H., assignors to General Electric Company, a corporation of New York Application August 26, 1958, Serial No. 757,281

6 Claims. (Cl. 324—107)

This invention relates generally to improvements in induction watthour meters and more particularly to an improved network meter than can be used for measuring electrical energy in two phases of a four wire Y-connected three-phase power distribution system.

In certain densely populated metropolitan areas, the aforesaid type of power distribution system is used to make available 120/208 volt 3-wire network service, with 120 volt 2-wire service available to residential users for lighting and some appliance loads. For those residential users having appliances such as room air conditioners, electric ranges, and electric water heaters, 120/208 volt 3-wire service is readily available, consisting of two phases of the four wire, Y-connected three phase network.

Heretofore, it has been customary to measure the energy in such two-phase residential networks by the use of watthour meters having two stators; i.e., by polyphase meters. However, two-element polyphase meters are inherently more costly to produce than single stator meters, as well as being larger, heavier, and more difficult to handle, and utilities have long expressed a desire to have a single stator meter that would accurately measure network power.

Conventional single stator 3-wire 120/240 volt single phase watthour meters can not be used to measure network power, for although such meters will correctly measure any 208 volt line-to-line power loads, the registration of the meter will be only 75% of the true value for any 120 volt line-to-neutral lighting loads. This results from the fact that the line-to-neutral loads will be metered at 208 volts and at a 30 degree phase displacement or at a power factor of .866 instead of at unity power factor— thereby registering only 75% of true value.

There have been previous attempts to produce a single-stator 3-wire network meter wherein phase-shifting circuits were connected to the current coils of the meter to compensate for the 30 degree phase displacement in each line; see, for example, U.S. Patent No. 1,722,157.

It is an object of this invention to produce an improved, fully compensated single-stator induction watthour meter for measurement of energy in two phases of a four wire Y-connected three-phase system.

Briefly, the invention comprises the use of special phase-shifting circuits connected to each of the current coils of a single-stator three wire meter. Such circuits include a novel arrangement of resistors which can be adjusted to obtain balance between the currents in the two phases, proper phase displacement of the currents in each current coil, and lag compensation for the meter. Also, the circuits include novel arrangements for obtaining proper temperature and overload compensation.

The invention, as well as its objects and advantages, will be better understood upon reference to the drawings annexed hereto, in which.

Figure 1:
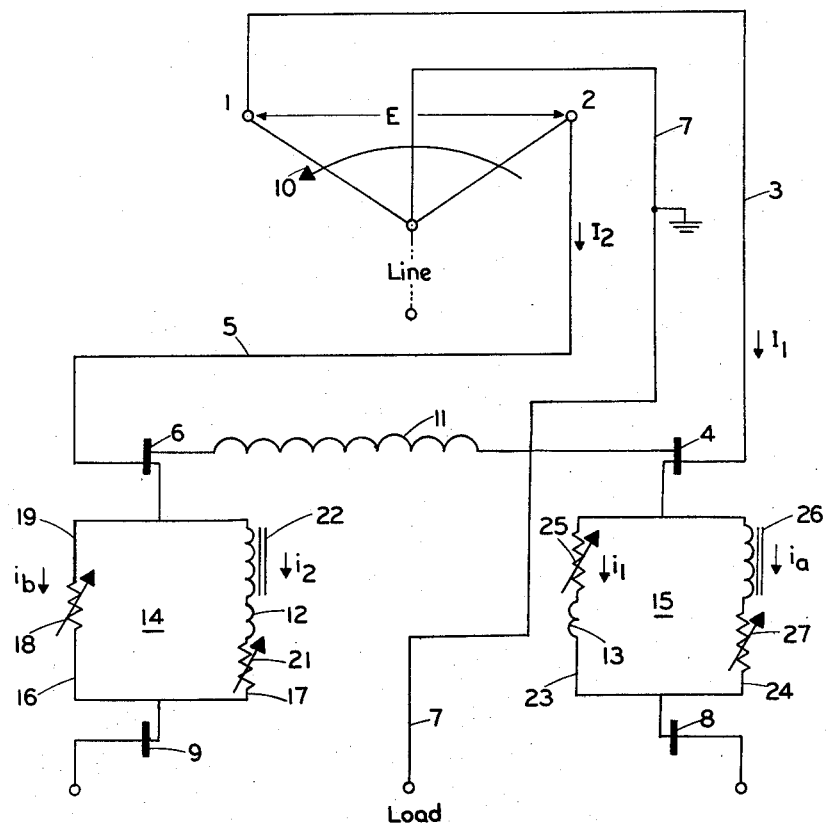
Figure 1 is a schematic diagram of the improved network meter, showing the connections of the meter in two phases of a four wire Y-connected three-phase system.

Referring to Figure 1, there is shown a schematic diagram of the network meter, along with the necessary connections to two phases of a four-wire, Y-connected, three-phase power generating system. The two phases comprising the network system are designated 1 and 2, respectively, with the arrow 10 showing the phase sequence in the system. The voltage across the two lines in the system is designated as E and normally has a magnitude of 208 volts. In this type of system, the line-to-neutral voltage in either phase is 120 volts. Line 1 of the system is connected by the lead 3 to one of the line terminals 4 of the meter, and line 2 of the system is connected by lead 5 to the other line terminal 6 of the meter. A lead 7 brings the neutral point of the system through the meter for connection to the appropriate load circuits. The load terminals of the meters 8 and 9 bring the lines 3 and 5, respectively, to the load side of the meter.

Figure 2:
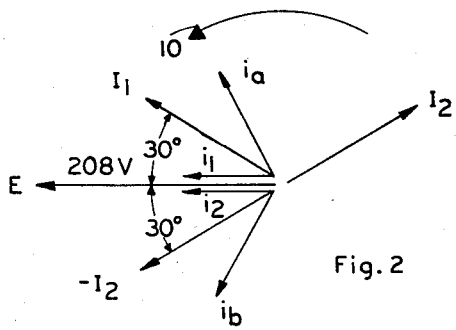
Figure 2 is a vector diagram illustrating the relationship of the currents and voltage in the meter circuits at unity power-factor.

Looking now at Figure 2, it is seen that with the aforesaid connections, and assuming conventional internal connections in the meter which would have one of the current coils in series with each line, the vector diagram of the line currents and line-to-line voltage shows a phase displacement between the line-to-line voltage and the line currents. Such phase displacement prevents a conventional three-wire meter from being used to measure network power. With the current coils in the meter reversely wound, it is seen that line currents $I_1$ and $-I_2$ are still 30° displaced from the voltage E. With such displacement, the meter would register only 75% of the true power used in the load circuits connected to the meter and obviously would render the meter totally unsuitable for use in a network system.

To overcome the aforesaid difficulty, phase shifting networks are used to bring the current traversing the coils of the meter in phase with the line-to-line voltage.

Referring again to Figure 1, the voltage coil is shown at 11, connected across the terminals 4, 6 and the current coils are shown at 12, 13, each of which forms a part of a phase shifting network 14, 15, respectively, connected thereto.

Considering the network 14, it comprises two parallel branches 16, 17 with the branch 16 including an adjustable resistor 18 and a compensating "jumper" resistor 19. Branch 17 includes the current coil 12 in series with an adjustable resistor 21 and an iron core inductor 22.

Phase shifting circuit 15 has two parallel branches 23, 24 with the branch 23 comprising the meter current coil 13 connected in series with an adjustable resistor 25. The branch 24 has an iron core inductor 26 connected in series with an adjustable resistor 27. The coils 12 and 13 are reversely wound in the meter such that the phase relation of the line currents $I_1$ and $-I_2$ is shown in Figure 2.

By having the phase shifting circuits 14 and 15, a portion of the line current is shunted away from the current coils and by a proper selection of circuit components, the line current is divided and shifted in phase to yield a current through each of the coils which is in phase with the line-to-line voltage E. In phase shifting circuit 15 the current in branch 23 is caused to lead the line current by the insertion of resistor 25, and the current in branch 24 is caused to lag the line current by the insertion of iron core inductor 26 in combination with resistor 27. The values of the resistors and the inductor are selected to provide the phase displacement necessary to bring the current through the coil $i_1$ in phase with the line-to-line voltage and at the same time adjust its magnitude to approximately one-half of the line current. That is to say, the circuit 15 causes line current $I_1$ to divide itself as it goes through the branches 23, 24 and shift in phase in each branch with the magnitude through branch 23 being about one-half of the line current.

In a similar manner, the load current $-I_2$ is divided by the phase shifting circuit 14 into currents $i_b$ and $i_2$ which, respectively, flow through branches 16, 17. $i_b$, which flows through the resistive circuit, leads the line current $-I_2$, and the current $i_2$ flowing through branch 17 lags the line current. Again, by proper selection of the values of the circuit components, the currents will divide in such a way that $i_2$ has a magnitude approximately one-half of $I_2$ and will be shifted in phase approximately 30°.

With the currents in each coil being phased properly with respect to the line-to-line voltage E, it is apparent that the meter will function to measure true watt hours.

Having discussed briefly the basic operating theory of the new meter, it is important now to consider the physical configuration of the meter including the phase shifting circuits. This aspect of the invention will be best understood upon reference to Figures 3, 4, and 5, wherein it is seen that the voltage winding and the two current coils are mounted on a conventional single stator of the type long used in single phase meter construction. In fact, the over-all appearance and style of the new meter closely resembles the appearance and style of single phase meters that have been heretofore produced in quantity, one example of such meters being that shown in U.S. Patent No. 2,668,275, Goss et al. It will be understood that the new meter, except for the phase shifting circuits, generally is identical to the type of meter shown in the Goss et al. patent and comprises the usual molded plastic base 28 through which the terminals 4, 6, 8, and 9 extend in a known manner, with the stator and phase shifting networks being supported on the base by means of an aluminum alloy frame 29 on which is also mounted the watthour register 31. The frame is similar to that shown in the Goss et al. patent and includes damping magnets and a magnetic suspension system for the induction disc 32 that forms a part of the meter. Since the base, the frame, the register, the disc, and the manner of mounting the disc are similar to the construction and arrangement shown in the Goss et al. patent, it is unnecessary to go into any further detail concerning their construction.

One difference over prior constructions is in the spacing of the frame from the base 28, which in this meter is greater to allow for positioning of the phase shifting networks within the meter and also provide enough space for proper heat dissipation within the meter. A pair of elongated mounting bosses is provided on opposite sides of the base to hold the frame, one of such bosses being shown at 33 in Figure 4.

Figure 3:
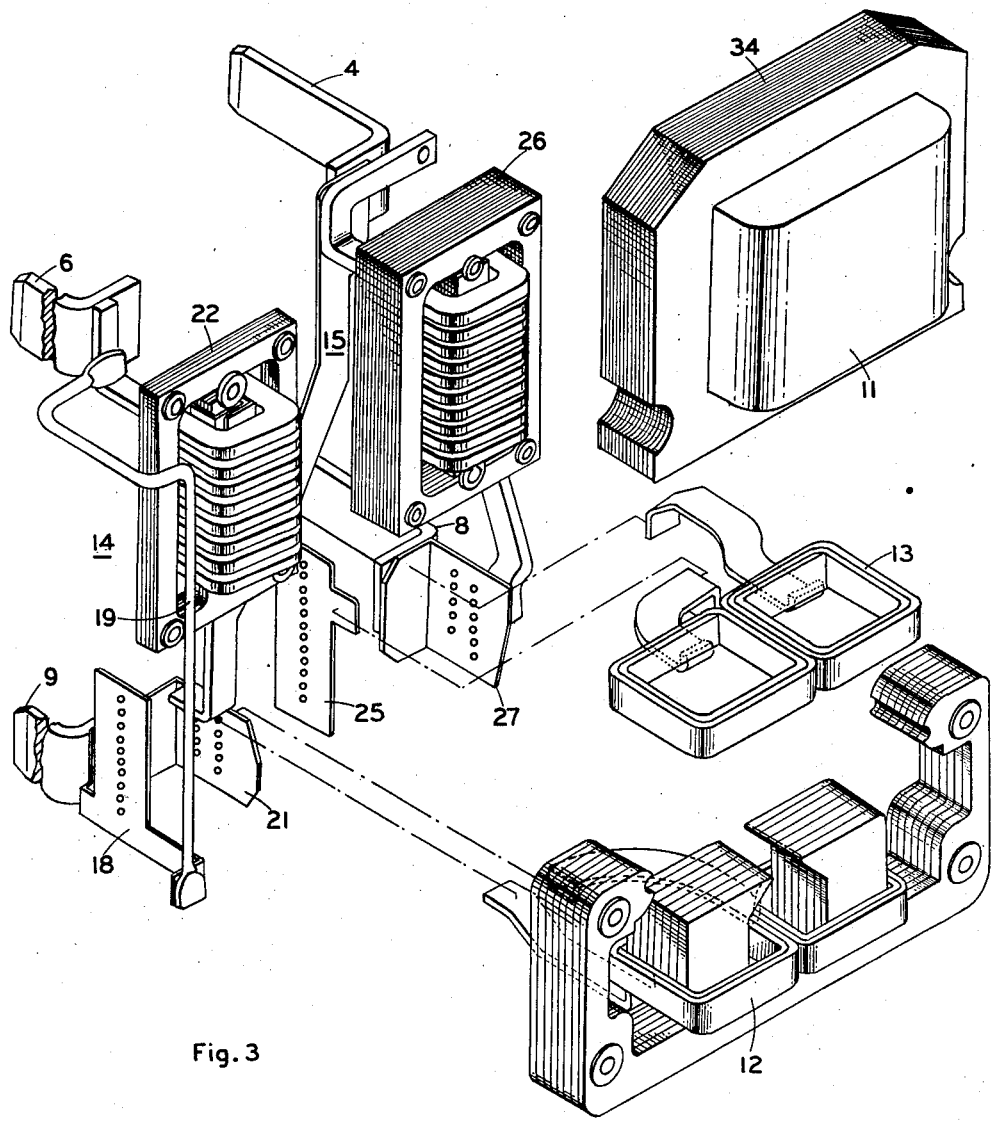
Figure 3 is an exploded diagram of a part of the new meter, showing the single stator and the phase-shifting circuits associated with the current coils.
Figure 4:
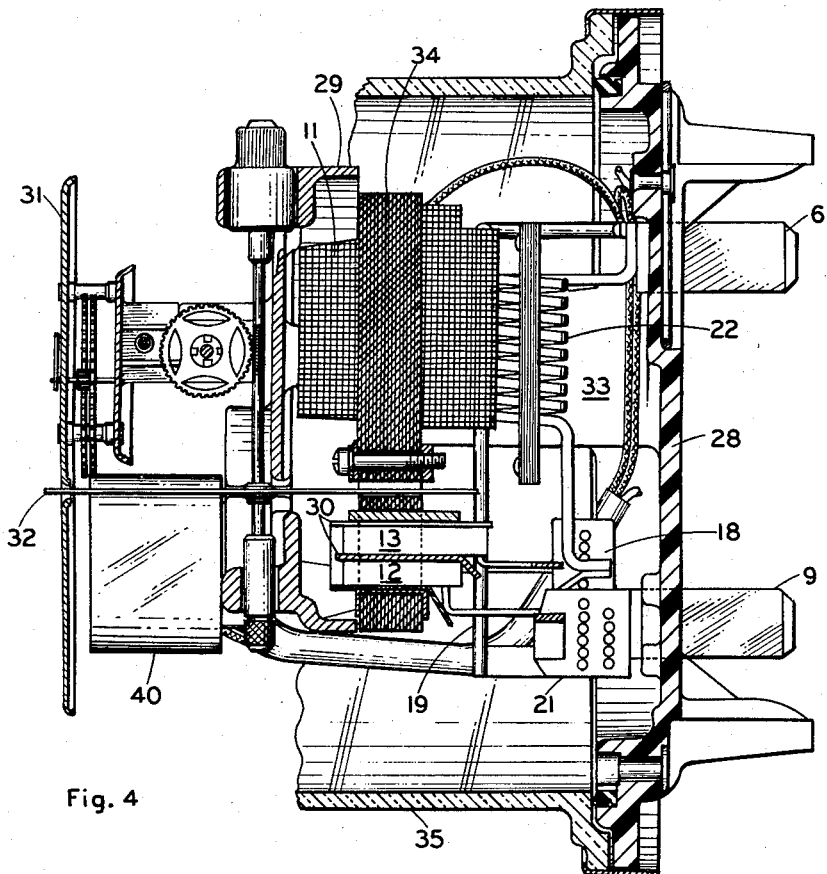
Figure 4 is a partly broken away sectional view of the completed meter.
Figure 5:
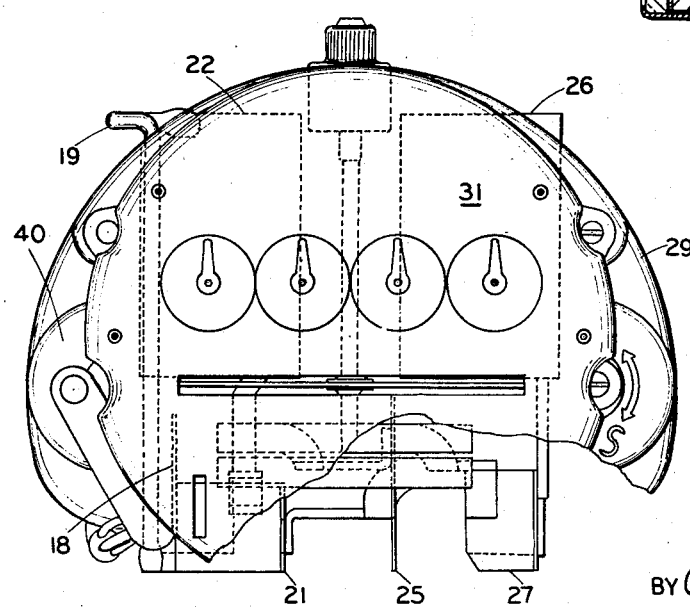
Figure 5 is a front view, partly broken away, of the meter frame stator, and register.

Looking at Figures 3 and 4, it is seen that the voltage winding 11 and current coils 12, 13 are mounted on a conventional single stator 34 made up of the usual stacked laminations of magnetic material, which are secured together by rivets or the like. The stator is such that the voltage electromagnet has a substantially E-shaped core, with the winding 11 being mounted on the center leg and suitably insulated therefrom. The current electromagnet has the usual pair of poles defined by the U-shaped center section, with the outer portions being used in the known manner to facilitate flux passage through the stator. As is seen in Figure 4, the usual air gap separates the current and voltage portions of the stator, and in this gap is journaled for rotation the disc 32.

The current coils themselves are made of heavy copper conductors, and each winding comprises a plurality of turns, with the turns on each equally divided between the two pole structures of the current electromagnet. The coils are insulated by the insulating inserts 30.

A conventional single loop light load plate may be used in the meter, the details of which are well known by those skilled in the art and omitted herein in the interests of clarity. The usual glass cover 35 may be used so that the resulting meter very much resembles a conventional single phase meter of the plug-in type.

Considering now the phase shifting networks, it is seen that the adjustable resistors 18, 21, 25, and 27 are all in the form of sheet metal members, each of which has one or more rows of spaced perforations therein. The connections to these plates are such that current flows across the portions of the plates which separate and space the apertures, and in the condition of the plates shown in Figure 3 the resistance of each plate is at a minimum. By severing the spacing elements between apertures the current path through the plates can be restricted to thereby increase the resistance of the plates. All of the plates are mounted in such a way that portions thereof extend below the meter frame 29 and at the rear thereof such that adjustment of resistance may be accomplished quite easily and with a minimum of difficulty when the meter is calibrated for use. Fairly heavy copper conductors are used as lead wires in the phase shifting networks to minimize the resistance in the leads and at the same time provide sufficient rigidity to help support the resistors and the inductors.

Figure 6:
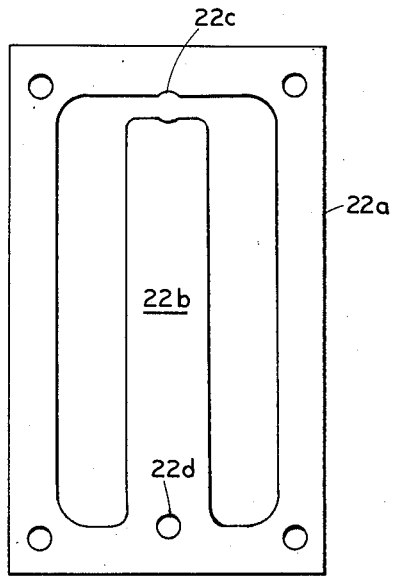
Figure 6 is a view of a single lamination of the iron core inductor connected to one of the current coils.
Figure 7:
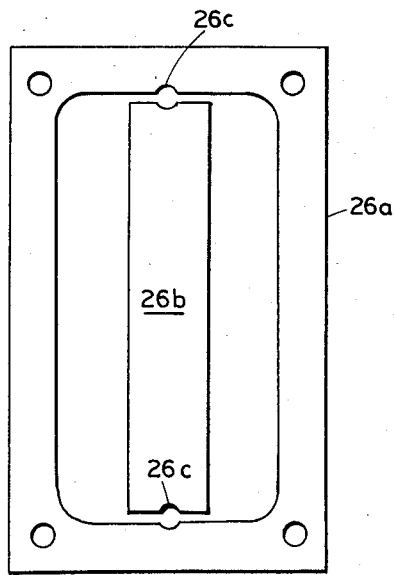
Figure 7 is a view of a single lamination of the iron core inductor connected to the other current coil.

As is best seen in Figures 3, 6, and 7, the inductors 22, 26 have somewhat similar core structures, each being formed from a stack of laminations which are held together by rivets or the like. A lamination of inductor 22 is shown in Figure 6, with Figure 7 showing the configuration of a lamination for the inductor 26. Each has a center core surrounded by the rectangular outer rim portion. The coils which form a part of the inductors are made of copper conductors which are covered with a suitable insulating material and mounted on the center leg in each of the inductor cores.

Both of the inductors are designed to produce a saturating action that helps to produce an optimum load curve for the meter. Thus, by proper selection of the number of turns in the inductors, the dimensions of the air gaps in each, the material used for the laminations, the number of laminations used, and the over-all dimensions of the core, the rate and degree of saturation is controlled, all in a known manner. It is important to note that in the inductor 26, the lamination 26a has its center piece 26b separated from the remainder of the lamination by a pair of air gaps 26c. However, the laminations 22a of inductor 22 utilize but one air gap 22c to separate the center piece 22b from the remainder of the lamination and a special unique saturating action is provided in lamination 22a where the center piece 22b joins the remainder of the lamination, by the inclusion of aperture 22d. Since the inductor 22 is in series with the current coil, it tends to choke or limit the current in this branch of phase shift-circuit 14. The aperture 22d permits the choking effect to be used to control the amount of current passing through the current core and thereby provide overload compensation in the meter in a novel way without the use of the usual overload shunt bridging the two poles of the current electro-magnet. At heavy loads the inductor laminations approach saturation so that further increases in load produce relatively little additional choking or current limiting. This allows an increasing proportion of current to pass through the current coil branch which in turn provides effective overload compensation. It has been found that the use of aperture 22d controls the choking effect in an optimum manner, resulting from the fact that there is a heavy flux concentration through this section of the lamination, with precise control of overload compensation easily controlled by proper selection of aperture diameter. The aperture need not be circular, as other configurations would give the same effect; but the circular arrangement is preferred in that it is a simple matter to vary its diameter as required to achieve the desired amount of compensation.

Figure 8:
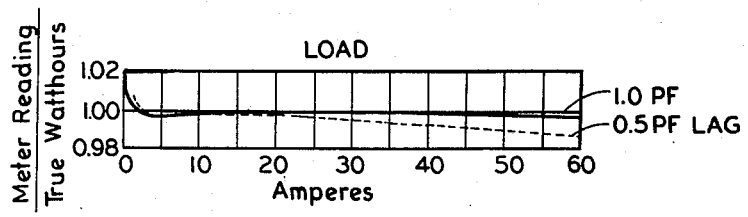
Figures 8 and 9 are load and temperature curves respectively, of the finished meter.

A typical load curve is shown in Figure 8 under conditions of unity power factor and one-half lagging power factor, and it is seen that the load curve is quite satisfactory for accurate metering performance.

Each of the resistors 18, 21, 25 and 27 is made of manganin or some other material having a substantially zero temperature coefficient of resistance to reduce the temperature errors in the meter. As is apparent from the above, proper calibration of the meter depends on the magnitude and phase angle of the current passing through the current coils. Current through the coils at all loads and temperatures should bear the same relation to the current through the other branches of the phase shifting networks once such relation has been established during calibration of the meter. In phase shifting circuit 15 temperature errors do not present a major problem because the manganin resistors 25, 27 vary but little with temperature and the changes in resistance of the copper in the current coil 13 and the inductor 26 will not disturb the ratio of the currents flowing in the parallel branches because each branch will change in a like amount, the net effect being for any changes to cancel one another.

Figure 9:
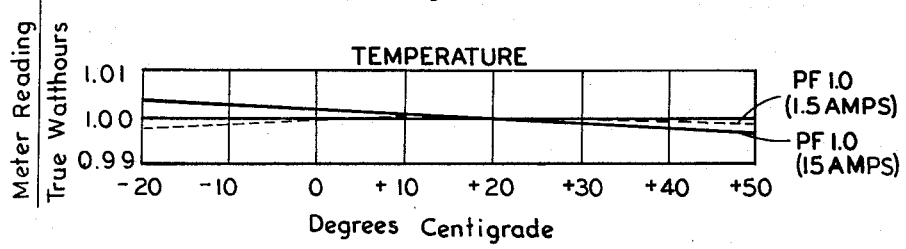

No such self-compensation is provided in phase shifting network 14, wherein the inductor is in series with the current coil. The copper in both the inductor and the coil will be affected by temperature and with the other branch of the circuit consisting solely of the manganin resistor, it is apparent that temperature errors will be produced in this circuit unless compensated for. To provide effective compensation in circuit 14, the special copper "jumper" resistor 19 is added, and its length and cross section is selected to provide a change in resistance with temperature that matches the change occurring in the inductor and current coil. By giving the jumper the proper shape, it can also be used to minimize the effects of stray magnetic fields on the meter. Since the circuits 14 and 15 are essentially closed loops, they are subject to stray fields. However, by a proper orientation of the jumper resistor 19 the two loops can be made to react oppositely to stray fields to thereby cancel such effects. Another way of minimizing the effects of stray field errors would be to give each of the closed loops a figure-8 configuration. However, this complicates the manufacture of the meter, and the jumper will be quite effective and very much simpler. Its shape and orientation are a matter of selection through experimentation, with the final shape being that shown in Figure 3. The temperature curve for the meter is shown in Figure 9, and it is readily apparent that the compensating arrangements heretofore discussed are quite effective to achieve excellent meter performance.

As described above, the resistors 18, 21, 25 and 27 are adjusted to provide the necessary phase shifting and control of the magnitude of the current passing through the meter coils. Since precise control of the phase angle of the current through the current coils can be achieved, it is apparent that the conventional lag plate which forms a part of all watthour meters may be eliminated. As is well known, the lag plate is used to establish the proper quadrature relationship between the current and voltage fluxes, and by having adjustable resistors in each branch, lagging can be achieved at the same time that the phase angle and magnitude of the current through the coils is adjusted. Since adjustment of either resistor affects the relative magnitude of the current in each of the parallel branches and also affects phase angle and are thus not independent in their action, it is apparent that calibration of the meter will be achieved by adjusting one resistor and then the other in each phase shifting circuit until optimum performance is attained.

From the above, it is seen that the new network meter is a practical design, utilizes a single stator construction, and provides full, effective compensation for normal metering purposes. The meter should be used for loads which have reasonably well balanced voltages and a power factor that normally is higher than 0.75. In using the new meter, it can be plugged into existing meter sockets, the only requirement being that the socket is wired to provide the phase sequence shown by the arrow in Figure 1. If desired, a built-in phase sequence indicating lamp may be used with the new meter to simplify its installation, such a device being shown at 40 in Figures 4 and 5, it being understood, however, that this feature forms no part of the subject invention. Should the lamp indicate improper phase sequence, the phase sequence can be corrected by reversing the line connections to the meter socket. The built-in phase sequence indicator is the subject of a copending application filed on September 18, 1958, Serial No. 761,900, Alexander M. McQuarrie, entitled, "Phase Sequence Indicator," and assigned to the same assignee as the subject application.

Therefore, while a particular embodiment of the subject invention has been shown and described herein, it is in the nature of description rather than limitation, and it will occur to those skilled in the art that various changes, modifications, and combinations may be made within the province of the appended claims, and without departing either in spirit or scope from this invention in its broader aspects.

What we claim as new and desire to secure by Letters Patent of the United States is:

1. An induction watthour meter for measuring electrical energy in two phases of a four wire Y-connected three-phase power distribution system, comprising, in combination: a stator assembly including voltage and current electromagnets separated by an air gap; an induction disc rotor journalled for rotation in said air gap; said voltage electromagnet including a voltage winding connectable across said two-phase lines; said current electromagnet including first and second current coils; said first coil being connectable in one of said two-phase lines and said second coil being connectable in the other of said two-phase lines; and first and second phase shifting circuits connected to said first and second current coils, respectively; said first phase shifting circuit comprising first and second parallel branches; said first branch including a first adjustable resistor and said second branch including a first iron-cored inductor and a second adjustable resistor in series with said first current coil; said second phase shifting circuit including third and fourth parallel branches; said third parallel branch including a second iron-cored inductor connected in series with a third adjustable resistor and said fourth parallel branch including a fourth adjustable resistor connected in series with said second coil.

2. The combination defined by claim 1 wherein all of said adjustable resistors are mounted to the rear of said stator assembly and are spaced therefrom, each of said resistors having an adjustable portion which extends beyond the edge of the proximate portion of said stator assembly.

3. An induction watthour meter for measuring electrical energy in two phases of a four wire Y-connected three-phase power distribution system, comprising, in combination: a stator assembly including voltage and current electromagnets separated by an air gap; an induction disc rotor journalled for rotation in said air gap; said voltage electromagnet including a voltage winding connectable across said two-phase lines; said current electromagnet including first and second current coils; said first coil being connectable in one of said two-phase lines and said second coil being connectable in the other of said two-phase lines; and first and second phase shifting circuits connected to said first and second current coils, respectively; said first phase shifting circuit comprising first and second parallel branches; said first branch including a first resistor and said second branch including a first iron-cored inductor in series with said first current coil; said second phase shifting circuit including third and fourth parallel branches; said third parallel branch including a second iron-cored inductor and said fourth parallel branch including a second resistor connected in series with said second coil; said first iron-cored inductor including a closed loop of magnetic material across which extends a magnetic core member, and a coil wound on said core member; said inductor including a saturating portion proximate to the main flux path therein.

4. An induction watthour meter for measuring electrical energy in two phases of a four wire Y-connected three-phase power distribution system, comprising, in combination: a stator assembly including voltage and current electromagnets separated by an air gap; an induction disc rotor journalled for rotation in said air gap; said voltage electromagnet including a voltage winding connectable across said two-phase lines; said current electromagnet including first and second current coils; said first coil being connectable in one of said two-phase lines and said second coil being connectable in the other of said two-phase lines; and first and second phase shifting circuits connected to said first and second current coils, respectively; said first phase shifting circuit comprising first and second parallel branches; said first branch including a first resistor and said second branch including a first iron-cored inductor in series with said first current coil; said second phase shifting circuit including third and fourth parallel branches; said third parallel branch including a second iron-cored inductor and said fourth parallel branch including a second resistor connected in series with said second coil; said first iron-cored inductor including a closed loop of magnetic material across which extends a magnetic core member; said core member having one end joined to said loop and the other end spaced from said loop; said core member proximate to said joint having an aperture therein; and a coil wound on said core member.

5. An induction watthour meter for measuring electrical energy in two phases of a four wire Y-connected three-phase power distribution system, comprising, in combination: a stator assembly including voltage and current electromagnets separated by an air gap; an induction disc rotor journalled for rotation in said air gap; said voltage electromagnet including a voltage winding connectable across said two-phase lines; said current electromagnet including first and second current coils; said first coil being connectable in one of said two-phase lines and said second coil being connectable in the other of said two-phase lines; and first and second phase shifting circuits connected to said first and second current coils, respectively; said first phase shifting circuit comprising first and second parallel branches; said first branch including a first adjustable resistor having a substantially zero temperature coefficient of resistance and a temperature compensating resistor; said second branch including a first iron-cored inductor and a second adjustable resistor having a substantially zero temperature coefficient of resistance in series with said first current coil; said second phase shifting circuit including third and fourth parallel branches; said third parallel branch including a second iron-cored inductor and a third adjustable resistor having a substantially zero temperature coefficient of resistance and said fourth parallel branch including a fourth adjustable resistor having a substantially zero temperature coefficient of resistance connected in series with said second coil; each of said inductors including coils; said current coils, said inductor coils, and said temperature compensating resistor being formed of a conducting material having substantially the same temperature coefficient of resistance.

6. An induction watthour meter for measuring electrical energy in two phases of a four wire Y-connected three-phase power distribution system, comprising, in combination: a stator assembly including voltage and current electromagnets separated by an air gap; an induction disc rotor journalled for rotation in said air gap; said voltage electromagnet including a voltage winding connectable across said two-phase lines; said current electromagnet including first and second current coils; said first coil being connectable in one of said two-phase lines and said second coil being connectable in the other of said two-phase lines; and first and second phase shifting circuits connected to said first and second current coils, respectively; said first phase shifting circuit comprising first and second parallel branches; said first branch including a first adjustable resistor and a temperature compensating resistor; said second branch including a first iron-cored inductor and a second adjustable resistor in series with said first current coil; said second phase shifting circuit including third and fourth parallel branches; said third parallel branch including a second iron-cored inductor connected in series with a third adjustable resistor and said fourth parallel branch including a fourth adjustable resistor connected in series with said second coil; each of said inductors including coils; said current coils, said inductor coils, and said temperature compensating resistor being formed of copper; said adjustable resistors being formed of manganin.

References Cited in the file of this patent

UNITED STATES PATENTS 1,722,157    Pratt _____ July 23, 1929